United States Patent
Tsai et al.

(10) Patent No.: US 10,606,230 B2
(45) Date of Patent: Mar. 31, 2020

(54) METHOD FOR ACQUIRING LOAD OPERATION PROBABILITY OF ELECTRIC POWER CONSUMER AND METHOD FOR ACQUIRING LOAD OPERATION PROBABILITY OF ELECTRIC POWER CONSUMER GROUPS

(71) Applicant: INSTITUTE FOR INFORMATION INDUSTRY, Taipei (TW)

(72) Inventors: Chia-Wei Tsai, Tainan (TW); Chun-Wei Yang, Magong (TW); Yung-Chieh Hung, Taipei (TW)

(73) Assignee: Institute for Information Industry, Taipei (TW)

( * ) Notice: Subject to any disclaimer, the term of this patent is extended or adjusted under 35 U.S.C. 154(b) by 608 days.

(21) Appl. No.: 15/367,613

(22) Filed: Dec. 2, 2016

(65) Prior Publication Data

US 2018/0143603 A1     May 24, 2018

(30) Foreign Application Priority Data

Nov. 23, 2016   (TW) .............................. 105138520 A

(51) Int. Cl.
     *G05B 19/04*           (2006.01)
     *G05B 19/042*         (2006.01)

(52) U.S. Cl.
     CPC .. *G05B 19/0428* (2013.01); *G05B 2219/2639* (2013.01)

(58) Field of Classification Search
     CPC ..................... G05B 19/0428; G05B 2219/2639
     See application file for complete search history.

(56) References Cited

U.S. PATENT DOCUMENTS

| | | | | |
|---|---|---|---|---|
| 8,849,776 | B2* | 9/2014 | Bingol | G06F 16/273 707/694 |
| 2009/0327776 | A1* | 12/2009 | Nguyen | G06F 1/26 713/320 |
| 2013/0138661 | A1* | 5/2013 | Lu | G06F 1/00 707/748 |
| 2013/0253890 | A1 | 9/2013 | Imahara et al. | |
| 2015/0120075 | A1 | 4/2015 | Le Roux et al. | |
| 2016/0370843 | A1* | 12/2016 | Gatson | G06F 1/3234 |
| 2017/0074913 | A1* | 3/2017 | Saito | G01R 21/133 |
| 2017/0089960 | A1* | 3/2017 | Mashima | G01R 22/10 |
| 2018/0309666 | A1* | 10/2018 | Lei | H04L 67/327 |

FOREIGN PATENT DOCUMENTS

TW              I492182 B       7/2015

* cited by examiner

*Primary Examiner* — Kenneth M Lo
*Assistant Examiner* — Mohammad A Rahman
(74) *Attorney, Agent, or Firm* — Rosenberg, Klein & Lee

(57) ABSTRACT

The present invention provides a method for acquiring the load operation probability of an electric power consumer and a method for acquiring the load operation probability of electric power consumer groups. The load information and the total power consumption information of an electric power consumer and the load information and the total power consumption information of electric power consumer groups can be given. The time-segment power consumption information of an electric power consumer and electric power consumer groups can be given. The load operation probability of an electric power consumer and electric power consumer groups can be given by calculations using algorithms.

8 Claims, 7 Drawing Sheets

… (1)

METHOD FOR ACQUIRING LOAD OPERATION PROBABILITY OF ELECTRIC POWER CONSUMER AND METHOD FOR ACQUIRING LOAD OPERATION PROBABILITY OF ELECTRIC POWER CONSUMER GROUPS

FIELD OF THE INVENTION

The present invention relates generally to a method for acquiring the load operation probability, and particularly to a method for acquiring the load operation probability of an electric power consumer and a method for acquiring the load operation probability of electric power consumer groups according to the load information, the behavior information, the feature information, and the total power consumption information.

BACKGROUND OF THE INVENTION

Due to popularization of environmental protection education and continuous warnings on overburden of the earth environment according to the natural sciences, in modern societies, people in the advanced countries have strong awareness in environmental protection and energy preservation. Countries worldwide seek for renewable energies to replace thermal and nuclear power generation. Consequently, wind, solar, geothermal, and tidal power generation technologies have been developing and improving constantly.

While developing renewable energies, governments worldwide promote energy and carbon reduction aggressively. Take household power consumption for example. According to the statistics of the US in 2008, household power consumption occupies 37% of the total power consumption. Besides, most people have improper habits of power consumption but are not aware of it, resulting in waste in the electric energy. Accordingly, once people's habits of domestic power consumption can be investigated, the purpose of energy preservation and carbon reduction can be achieved effectively.

Nonetheless, the meters used by most current electric power consumers are traditional meters, which can only provide the total power consumption of the electric power consumer in the past month or in the past period. Then, by comparing the total power consumption with that in the previous month or in the same period of the last year, whether the power consumption of the electric power consumer is improved can be observed.

There have many advanced countries that adopt novel smart meters and weed out traditional ones. Although smart meters can give the current power consumption of an electric power consumer real-timely, it is difficult for them to identify the operation conditions of the electric power consumer's appliances for further analysis on the power consumption behavior of the electric power consumer and accordingly planning and managing energy preservation.

To analyze the power consumption behavior of an electric power consumer, most current methods are invasive load operation detection. For applying the detection method, an extra measuring apparatus or sensing device should be installed to each load (namely, each appliance) of the electric power consumer. According to the information given by the measuring apparatus or sensing device, whether the individual load is in the on or off condition can be judged. Although this method can acquire the load operation conditions of an electric power consumer, the adoption cost is expensive and the maintenance is challenging, making it difficult to promote to all electric power consumers. Consequently, the invasive method for acquiring the load operation conditions of an electric power consumer is not popular.

Accordingly, it is required to have a method for noninvasively acquiring the load operation conditions of an electric power consumer.

SUMMARY

An objective of the present invention is to provide a method for acquiring the load operation probability of an electric power consumer according to the calculations on the load information and the total power consumption information of the electric power consumer.

In order to achieve the above objective and efficacy, according to an embodiment of the present invention, a method for acquiring the load operation probability of an electric power consumer is disclosed. The method comprises steps of: acquiring a plurality pieces of load information of the electric power consumer and the total power consumption information of the plurality pieces of load information in a period; dividing the above period into a plurality of time segments and calculating to give a plurality pieces of time-segment power consumption information; and calculating the plurality pieces of time-segment power consumption information and the plurality of load information to give a first operation probability of load corresponding to the plurality pieces of load information, respectively.

According to an embodiment of the present invention, the first operation probability of load corresponding to the plurality pieces of load information, respectively, is calculated and given according to the plurality pieces of time-segment power consumption information, the behavior information, and the plurality pieces of load information.

According to an embodiment of the present invention, the first operation probability of load corresponding to the plurality pieces of load information, respectively, is calculated and given according to the plurality pieces of time-segment power consumption information, the feature information, and the plurality pieces of load information.

According to an embodiment of the present invention, the first operation probability of load corresponding to the plurality pieces of load information, respectively, is calculated and given according to the plurality pieces of time-segment power consumption information, the behavior information, the feature information, and the plurality pieces of load information.

According to an embodiment of the present invention, the first operation probability of load is calculated and given by using single- or double-particle algorithms.

According to an embodiment of the present invention, when the first operation probability of load is calculated and given by using a plurality of algorithms, the method further comprises steps of: calculating the plurality pieces of time-segment power consumption information and the plurality pieces of load information using the plurality of algorithms and giving the first operation probability of load corresponding to the plurality pieces of load information, respectively; multiplying the first operation probability of each load by the weighting corresponding to the algorithm giving the first operation probability of load and giving a plurality of weighted operation probabilities of loads; and giving a second operation probability of the plurality of loads according to the plurality of weighted operation probabilities of loads.

According to an embodiment of the present invention, after the step of calculating and giving the plurality of time-segment power consumption information using the power consumption information and time segments, the method further comprises steps of normalizing the plurality of time-segment power consumption information; and normalizing the plurality of load information.

According to an embodiment of the present invention, the load information is the operation power values of the load.

According to an embodiment of the present invention, the plurality of loads have different power ratings.

In addition, the present invention further provides a method for acquiring the load operation probability of electric power consumer groups. The method comprises steps of: acquiring a plurality pieces of load information of a plurality of electric power consumer groups, respectively, and the total group power consumption information of the plurality pieces of load information in a period; dividing the above period into a plurality of time segments and calculating to give a plurality pieces of time-segment power consumption information; and calculating the plurality pieces of time-segment power consumption information and the plurality of load information to give a first operation probability of load corresponding to the plurality pieces of load information, respectively.

DETAILED DESCRIPTION

In order to make the structure and characteristics as well as the effectiveness of the present invention to be further understood and recognized, the detailed description of the present invention is provided as follows along with embodiments and accompanying figures.

According to the prior art, invasive load operation detection of an electric power consumer requires higher cost and the maintenance is difficult. Thereby, the present invention provides a method for acquiring the load operation probability of an electric power consumer according to the load information, the behavior information, the feature information, and the total power consumption information of the electric power consumer.

Figure 1:
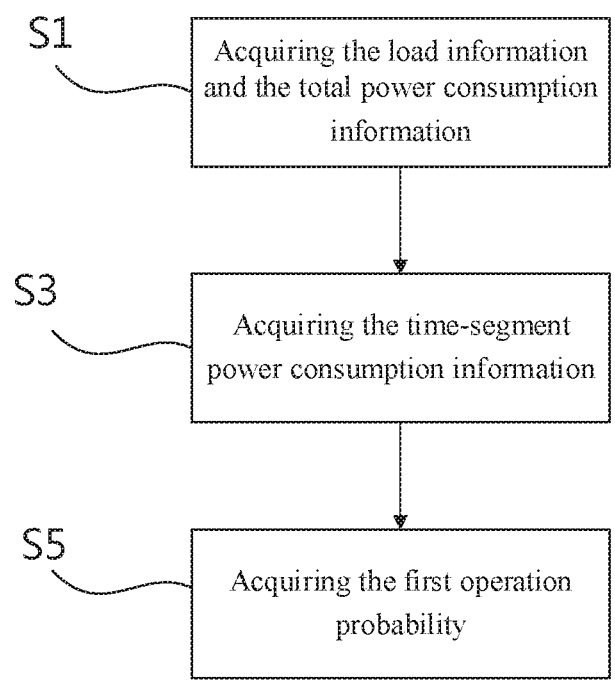
FIG. 1 shows a flowchart of the method for acquiring the load operation probability of an electric power consumer according to the first embodiment of the present invention.

The flow of the method for acquiring the load operation probability of an electric power consumer according to the first embodiment of the present invention will be described. Please refer to FIG. 1, which shows a flowchart of the method for acquiring the load operation probability of an electric power consumer according to the first embodiment of the present invention. As shown in the figure, the method for acquiring the load operation probability of an electric power consumer according to the present embodiment comprises steps of:

Step S1: Acquiring the load information and the total power consumption information:

Step S3: Acquiring the time-segment power consumption information; and

Step S5: Acquiring the first operation probability.

Figure 2:
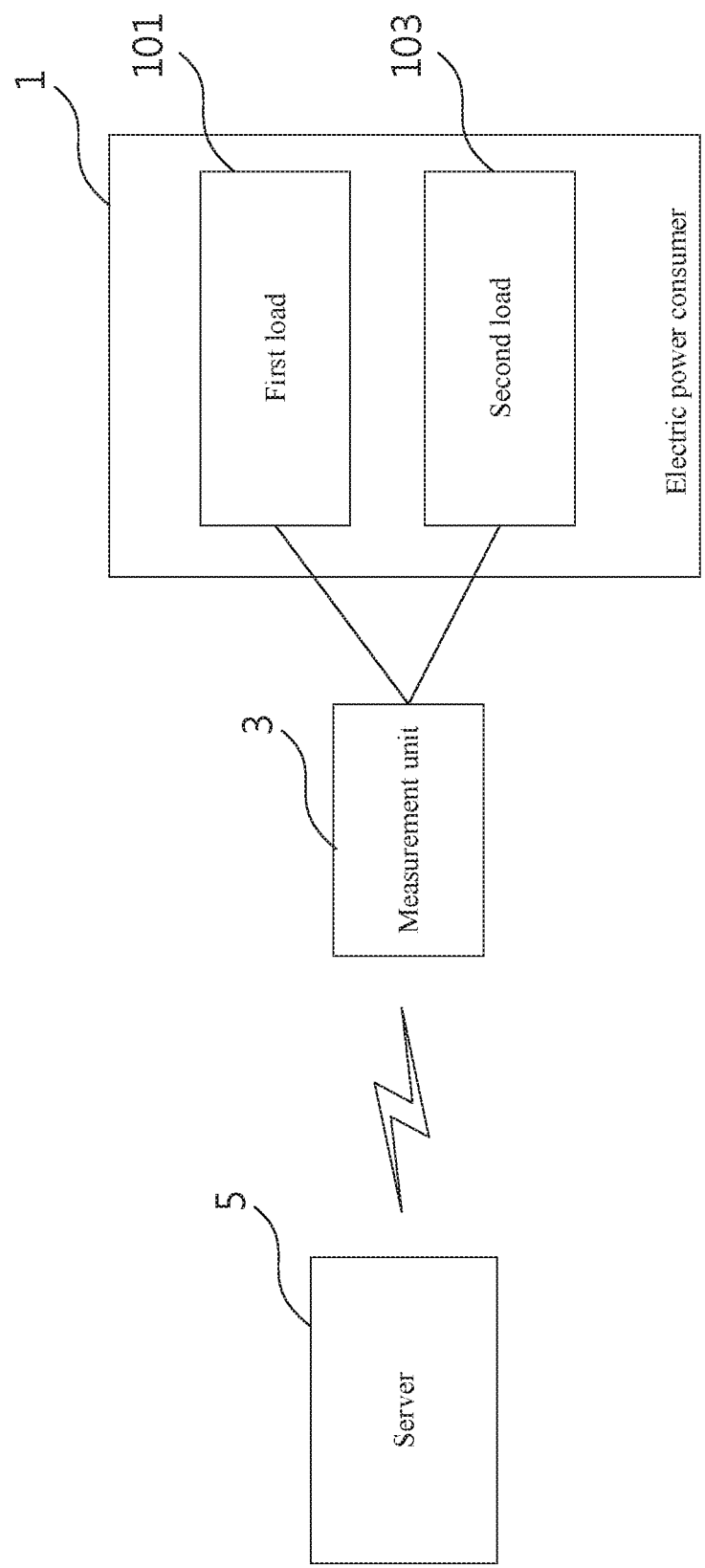
FIG. 2 shows a system schematic diagram of the method for acquiring the load operation probability of an electric power consumer according to the first embodiment of the present invention.

Next, the system for the method for acquiring the load operation probability of an electric power consumer according to the first embodiment of the present invention will be described. Please refer to FIG. 2, which shows a system schematic diagram of the method for acquiring the load operation probability of an electric power consumer according to the first embodiment of the present invention. As shown in the figure, the system for the method for acquiring the load operation probability of an electric power consumer according to the present invention comprises an electric power consumer 1, a measurement unit 3, and a server 5. The electric power consumer 1 includes a first load 101 and a second load 103.

The server 5 described above can be an electronic device such as a smartphone, a personal digital assistant (PDA), a tablet computer, a notebook computer, a desktop computer, a sever host, or a workstation.

The first and second loads 101, 103 described above can be the appliances owned by the electric power consumer 1, for example, computers, TVs, refrigerators, microwave ovens, electromagnetic ovens, or air conditioners.

The measurement unit 3 described above is a measurement unit capable of measuring the total power consumption of the electric power consumer 1 in a period, such as a smart meter. For example, the measurement unit 3 can acquire the total power consumption of the electric power consumer 1 for every 10 minutes. The measured total power consumption of the electric power consumer 1 is transmitted to the server 5 in the wired or wireless method.

In the following, the flow of the method for acquiring the load operation probability of an electric power consumer according to the first embodiment of the present invention will be described. Please refer to FIG. 1 and FIG. 2, when the load operation probability of an electric power consumer is desired, the steps S1 through S5 will be executed.

In the step S1 of acquiring the load information and the total power consumption information, the server 5 acquires the load information of the first load 101 and the second load 103 of the electric power consumer 1 as well as the total power consumption information of the first load 101 and the second load 103 in a period. The load information is the load operation power rating. In other words, the total power consumption information is the total power consumption of a plurality of loads of the electric power consumer 1 in a period acquired via the measurement unit 3. The above total power consumption information can be the power consumption information of the electric power consumer 1 for every 15 minutes or the daily load curves of the electric power consumer 1.

In the step S3 of acquiring the time-segment power consumption information, the server 5 divides the above period into a plurality of time segments and acquires the time-segment power consumption information corresponding to each time segment according to the plurality of time segments and the total power consumption information. That is to say, the number of the pieces of time-segment power consumption information is plural. To elaborate, when the acquired total power consumption information is daily total power consumption information, the period is a day. If hour is the division unit, the period is divided into 24 time segments. Alternatively, the above period can be an hour, 10 hours, one week, two weeks, or one month.

The above time-segment power consumption information is the average value of the total power consumption information in the corresponding time segment. For example, if the time segment is one hour, the period is one day, the measurement unit 3 transmits the power consumption information to the server 5 for every 10 minutes, and there are 6 pieces of power consumption information in the total power consumption information corresponding to the time segment, then the server 5 averages the 6 pieces of power consumption information and gives the time-segment power consumption information. The averaging methods include arithmetic means, harmonic means, geometric means, and weighted means.

After the server 5 acquires the time-segment power consumption information, a normalization algorithm is adopted for giving the normalized time-segment power consumption information. In addition, the server 5 also acquires the normalized load information of the first load 101 and the normalized load information of the second load 103 using the normalization algorithm. The above normalization algorithm includes the min-max normalization, the log-function conversion normalization, and the zero-mean normalization.

According to an embodiment of the present invention, the time segments are not equal. Namely, the period can be divided by different time segments. For example, when the period is one day, "hour" can be the unit for dividing the first 12 hours into 12 time segments. Then, "30 minutes" can be the unit for dividing the rest 12 hours into 24 time segments.

In the step S5 of acquiring the first operation probability, the server 5 calculates the time-segment power consumption information, the load information of the first load 101, and the load information of the second load 105 to give the first operation probability of load. Furthermore, because the time-segment power consumption information will be approximated to the load information of the first load 101 and the load information of the second load 105, the following equation can be adopted:

$$W = \sum_{i=1}^{2} P_i \times W_i$$

where W is the time-segment power consumption information; Pi is the first operation probability of the ith load; and Wi is the load information of the ith load. The above equation assumes that the electric power consumer 1 includes the first load 101 and the second load 103. If the electric power consumer 1 includes n loads, the equation becomes:

$$W = \sum_{i=1}^{n} P_i \times W_i$$

Because the load information and the time-segment power consumption information are known, the corresponding first operation probability of each load can be calculated by algorithms. According to the present embodiment, the corresponding first operation probability of load represents the operation probability of the load in this time segment. The above algorithms include single-particle algorithms, such as the hill-climbing algorithm, the simulated annealing algorithm, or other single-particle algorithms, or double-particle algorithms, such as the genetic algorithm, the particle swarm optimization algorithm, the ant colony optimization algorithm, or other double-particle algorithms. Hence, the method for acquiring the load operation probability of an electric power consumer according the first embodiment of the present invention is finished. According to the present embodiment, the operation probability of each load of the electric power consumer 1 can be calculated by a noninvasive method. Because it is not required to install detecting units on each load, compared to invasive load operation detection, the present embodiment has a lower cost on analyzing load operation probabilities.

According to an embodiment of the present invention, in the step S1, the behavior information of the electric power consumer 1 will be further acquired. The behavior information of the electric power consumer 1 can be selected from the group consisting of work days/non-work days, entertainment time, dining time, toilet time, bedtime, and other daily routines.

Given the behavior information of the electric power consumer 1 will be acquired in the step S1, in the step S5, the server 5 will calculate the time-segment power consumption information, behavior information, and the plurality pieces of load information and give the first operation probabilities of load corresponding to the plurality pieces of load information. When the electric power consumer 1 includes n loads, the equation becomes:

$$W = \sum_{i=1}^{n} \alpha \times P_i \times W_i$$

where $\alpha$ is the weighting of the load operation probability and its equation is:

$$\alpha = P^B$$

where $P^B$ is the probability of the influence of the behavior information on load operation. When there are n pieces of behavior information, $\alpha$ becomes:

$$\alpha = P_1^B \times P_2^B \ldots \times P_n^B$$

At different times, the behavior of the electric power consumer 1 places different influence on the operation probabilities of different loads. For example, when the corresponding time of the time-segment power consumption information is the dinner time after work, the dining information in the behavior information of the electric power consumer 1 will place higher influences on the loads such as microwave ovens or electromagnetic ovens and resulting in a higher PB. On the contrary, the influences on the loads such as video games is lower and leading to a lower PB. In other words, the weighting for the operation probability of each load can adjusted according to different time and different behavior information. According to the present embodiment, the accuracy of the acquired first probability can be further improved. Besides, the convergence rate in calculating the first operation probability can be accelerated.

According to an embodiment of the present invention, in the step S1, the feature information of the electric power consumer 1 will be further acquired. The feature information of the electric power consumer 1 can be selected from the group consisting of weather feature, temperature feature, residence location feature, building feature (for example, floor area, number of rooms, building materials), electric power consumer feature (for example, the families of the electric power consumer, the income of the electric power consumer), and power consumption feature (for example, average daily power consumption, average load, average peak load, and average loading rate).

Given the behavior information of the electric power consumer 1 will be acquired in the step S1, in the step S5, the server 5 will calculate the time-segment power consumption information, feature information, and the plurality pieces of load information and give the first operation probabilities of load corresponding to the plurality pieces of load information. When the electric power consumer 1 includes n loads, the equation becomes:

$$W = \sum_{i=1}^{n} \alpha \times P_i \times W_i$$

where $\alpha$ is the weighting of the load operation probability and its equation is:

$$\alpha = P^F$$

where $P^F$ is the probability of the influence of the feature information on load operation. When there are n pieces of feature information, $\alpha$ becomes:

$$\alpha = P_1^F \times P_2^F \ldots \times P_n^F$$

The features of the electric power consumer 1 will also place influence on the operation probabilities of loads. For example, the temperature feature in the feature information of the electric power consumer 1 has higher influences on the loads such as air conditioners, electric fans and resulting in a higher PF. In other words, the weighting for the operation probability of each load can adjusted according to the feature information of the electric power consumer 1. According to the present embodiment, the accuracy of the acquired first probability can be further improved. Besides, the convergence rate in calculating the first operation probability can be accelerated.

According to an embodiment of the present invention, in the step S1, the feature information and the behavior information of the electric power consumer 1 will be further acquired.

Given the behavior information and the behavior information of the electric power consumer 1 will be acquired in the step S1, in the step S5, the server 5 will calculate the time-segment power consumption information, feature information, behavior information, and the plurality pieces of load information and give the first operation probabilities of load corresponding to the plurality pieces of load information. When the electric power consumer 1 includes n loads, the equation becomes:

$$W = \sum_{i=1}^{n} \alpha \times P_i \times W_i$$

where $\alpha$ is the weighting of the load operation probability and its equation is:

$$\alpha = P^F \times P^B$$

When there are n pieces of feature information and m pieces of behavior information, $\alpha$ becomes:

$$\alpha = P_1^F \times P_2^F \times \ldots \times P_n^F \times P_1^B \times P_2^B \times \ldots \times P_n^B$$

According to the present embodiment, the influences of both behaviors and features on the load operation probabilities can be considered concurrently. The accuracy of the acquired first probability can be further improved. Besides, the convergence rate in calculating the first operation probability can be accelerated.

Figure 3:
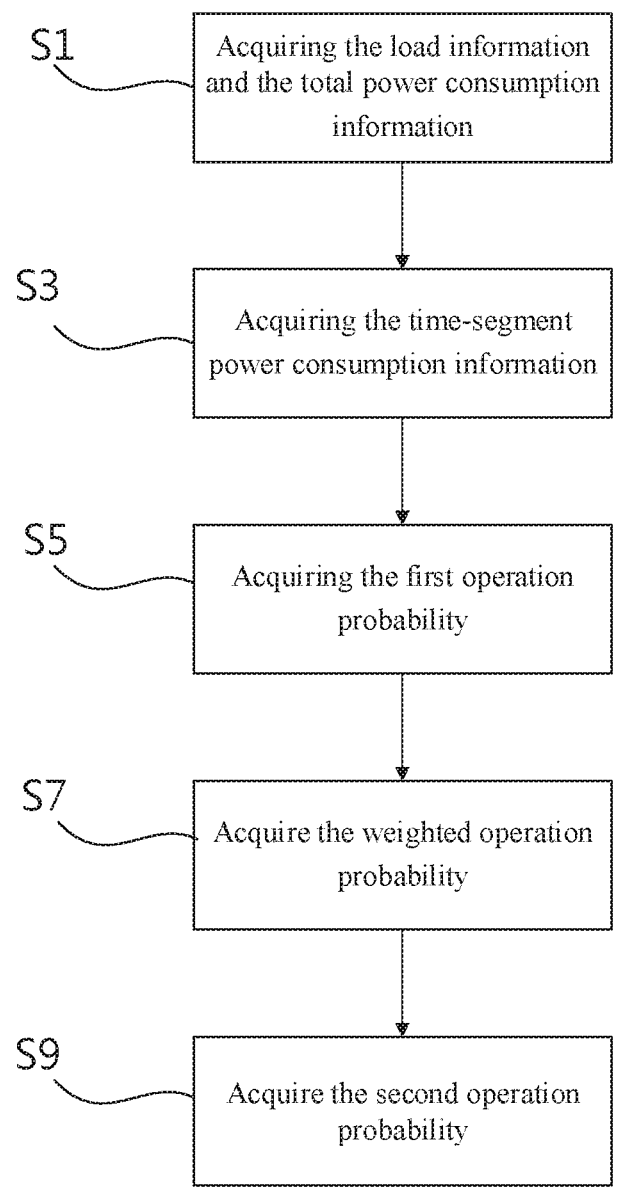
FIG. 3 shows a flowchart of the method for acquiring the load operation probability of an electric power consumer according to the second embodiment of the present invention.

Next, the flow of the method for acquiring the load operation probability of an electric power consumer according to the second embodiment of the present invention will be described. Please refer to FIG. 3, which shows a flowchart of the method for acquiring the load operation probability of an electric power consumer according to the second embodiment of the present invention. As shown in the figure, the difference between the present embodiment and the first one is that the present embodiment further comprises step S7 and step S9.

According to the present embodiment, in the step S5, the server 5 calculates to give the first operation probability of the first load 101 and the first operation probability of the second load 103. In other words, in the step S5, the server 5 will acquire a plurality of first operation probabilities of the first load 101 and a plurality of first operation probabilities of the second load 103. Each first operation probability of the first load 101 corresponds to an algorithm, respectively; and each first operation probability of the second load 103 corresponds to an algorithm, respectively.

In the step S7, acquire the weighted operation probability. The server 5 multiplies each first operation probability of the first load 101 by a weighting of the corresponding algorithm, respectively, and gives a plurality of weighted operation probabilities of the first load 101. In addition, the server 5 multiplies each first operation probability of the second load 103 by a weighting of the corresponding algorithm, respectively, and gives a plurality of weighted operation probabilities of the second load 103.

In the step S9, acquire the second operation probability. The server 5 gives the second operation probability of the first load 101 and the second operation probability of the second load 103 using an optimization support strategy algorithm (for example, the augmented Lagrangian method) according to the plurality of weighted operation probabilities of the first load 101 and the plurality of weighted operation probabilities of the second load 103. According to the present embodiment, after the first operation probability of each load is acquired using multiple algorithms, the second operation probability of each load can be acquired using the weighting method and the optimization support strategy. Compared with the first embodiment using a single algorithm, the second operation probabilities acquired according to the present embodiment can give better accuracy.

According to an embodiment of the present invention, the operation power ratings of the first and second loads 101, 103 are different.

Figure 4:
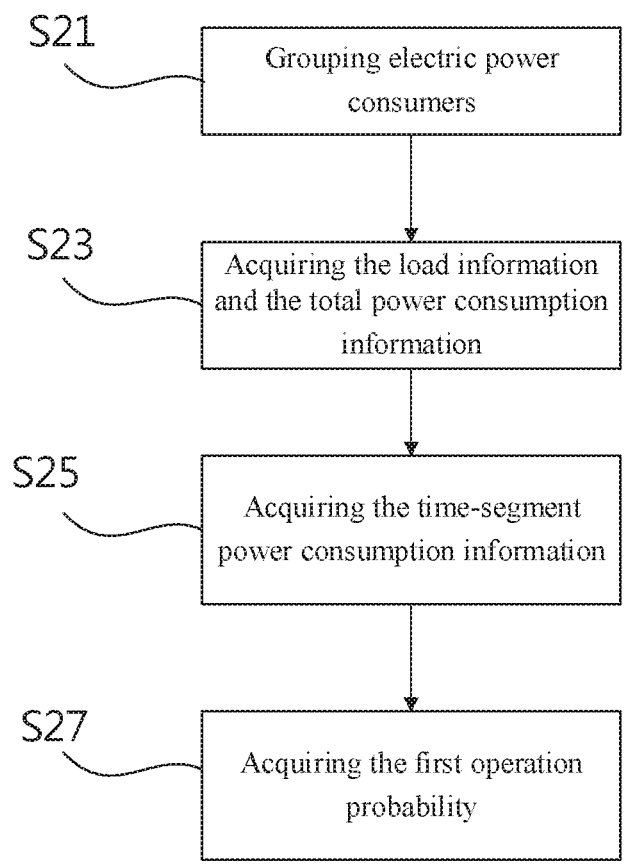
FIG. 4 shows a flowchart of the method for acquiring the load operation probability of electric power consumer groups according to the third embodiment of the present invention.

Here, the flow of the method for acquiring the load operation probability of electric power consumer groups according to the third embodiment of the present invention will be described. Please refer to FIG. 4, which shows a flowchart of the method for acquiring the load operation probability of electric power consumer groups according to the third embodiment of the present invention. As shown in the figure, the method for acquiring the load operation probability of electric power consumer groups according to the present embodiment comprises steps of:

Step S21: Grouping electric power consumers;
Step S23: Acquiring the load information and the total power consumption information;
Step S25: Acquiring the time-segment power consumption information; and
Step S27: Acquiring the first operation probability.

Figure 5A:
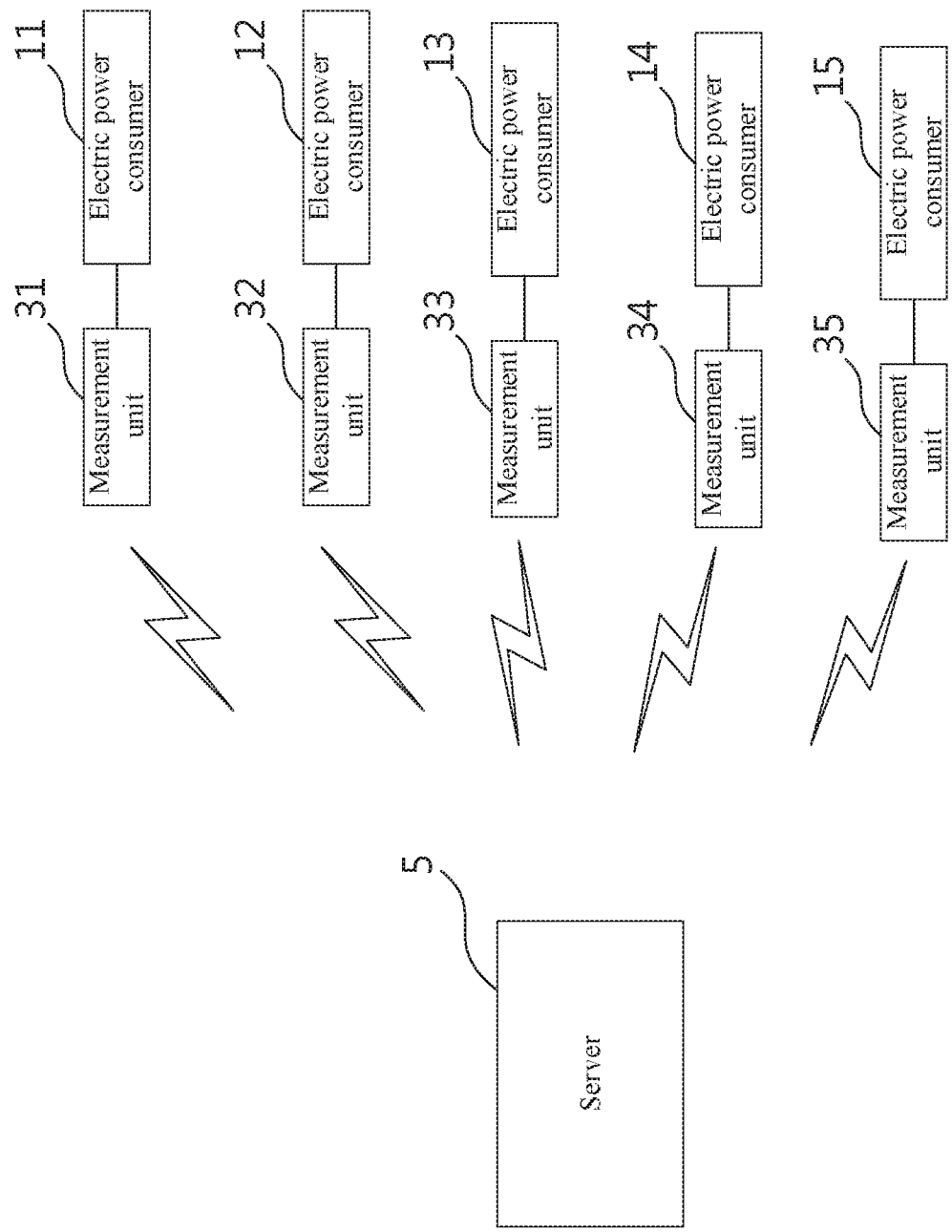
FIG. 5A shows a system schematic diagram of the method for acquiring the load operation probability of electric power consumer groups according to the third embodiment of the present invention.

Next, the system for achieving the method for acquiring the load operation probability of electric power consumer groups according to the third embodiment of the present invention will be described. Please refer to FIG. 5A, which shows a system schematic diagram of the method for acquiring the load operation probability of electric power consumer groups according to the third embodiment of the present invention. As shown in the figure, the system for achieving the method for acquiring the load operation probability of electric power consumer groups according to the third embodiment of the present invention comprises: an electric power consumer 11 connected with a measurement unit 31, an electric power consumer 12 connected with a measurement unit 32, an electric power consumer 13 connected with a measurement unit 33, an electric power consumer 14 connected with a measurement unit 34, an electric power consumer 15 connected with a measurement unit 35, and a server 5. The electric power consumers 11~15 all include a plurality of loads, respectively.

In the following, the flow of the method for acquiring the load operation probability of electric power consumer groups according to the third embodiment of the present invention will be described. Please refer to FIG. 4 and FIG. 5A. When the load operation probability of electric power consumer groups is required, the step S21 through the step S27 will be executed.

Figure 5B:
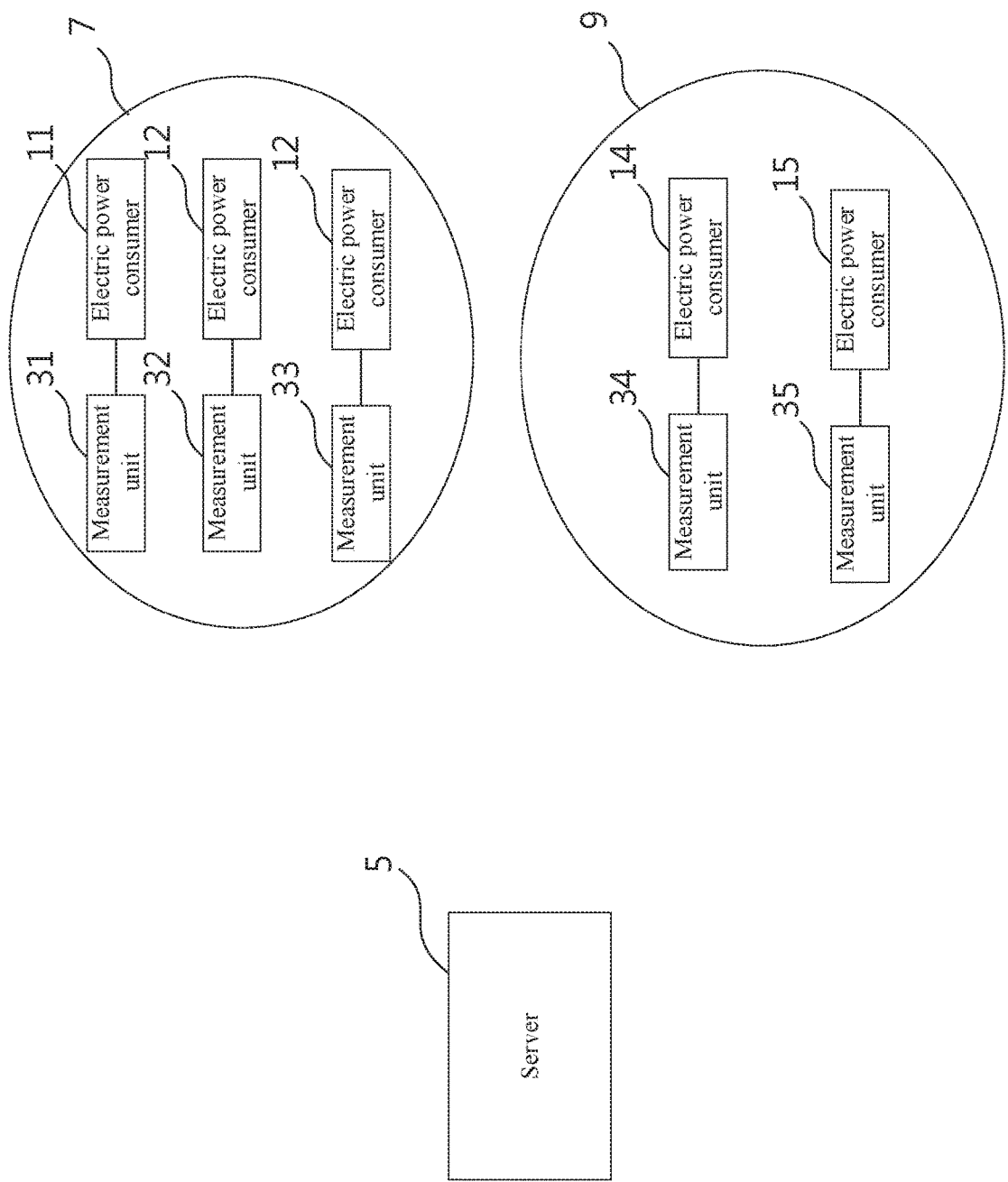
FIG. 5B shows a system schematic diagram of the method for acquiring the load operation probability of electric power consumer groups according to the third embodiment of the present invention, used for illustrating grouping electric power consumers into electric power consumer groups.

In the step S21, group electric power consumers. The server 5 groups the electric power consumers 11~15 using a grouping algorithm according to their respective behavior information or/and feature information or/and load information or/and total power consumption information. As shown in FIG. 5B, the server 5 groups the electric power consumer 11, the electric power consumer 12, and the electric power consumer 13 into the electric power consumer group 7, and the electric power consumer 14 and the electric power consumer 15 into the electric power consumer group 9. The above grouping algorithm can be the K-mean algorithm, the hierarchical clustering algorithm, or others.

In the step S23, acquire the load information and the total power consumption information. The server 5 acquires a plurality pieces of load information of the electric power consumer. Because grouping is performed using the grouping algorithm, the electric power consumers in the same group have approximate loads, making their load information approximate. The server 5 calculates to give the group total power consumption information in a period according to the total power consumption in the electric power consumer group. The server 5 gives the group total power consumption information by averaging. The server 5 uses the normalization algorithm to calculate and give the normalized load information and the normalized group total power consumption information.

In the step S25, acquire the time-segment power consumption information. The server 5 divides the above period into a plurality of time segments, and gives the time-segment power consumption information corresponding to each time segment according to the plurality of time segments and the group total power consumption information.

In the step S27, acquire the first operation probability. The server 5 calculates to give the first operation probability of the corresponding load in the plurality pieces of load information, respectively, according to the time-segment information and the load information of the electric power consumer group.

According to an embodiment of the present invention, in the step S27, the server 5 calculates to give the first operation probability of the corresponding load in the plurality pieces of load information, respectively, according to the time-segment information of the electric power consumer group, the load information of the electric power consumer group, and the feature information of the electric power consumer group.

According to an embodiment of the present invention, in the step S27, the server 5 calculates to give the first operation probability of the corresponding load in the plurality pieces of load information, respectively, according to the time-segment information of the electric power consumer group, the load information of the electric power consumer group, and the behavior information of the electric power consumer group.

According to an embodiment of the present invention, in the step S27, the server 5 calculates to give the first operation probability of the corresponding load in the plurality pieces of load information, respectively, according to the time-segment information of the electric power consumer group, the load information of the electric power consumer group, the feature information of the electric power consumer group, and the behavior information of the electric power consumer group.

Because the number of electric power consumers is massive, if the load operation probability for each electric power consumer is calculated individually, much computation time and many computation resources will be spent. According to the present embodiment, similar electric power consumers are grouped into electric power consumer groups for reducing computation time and resources.

Figure 6:
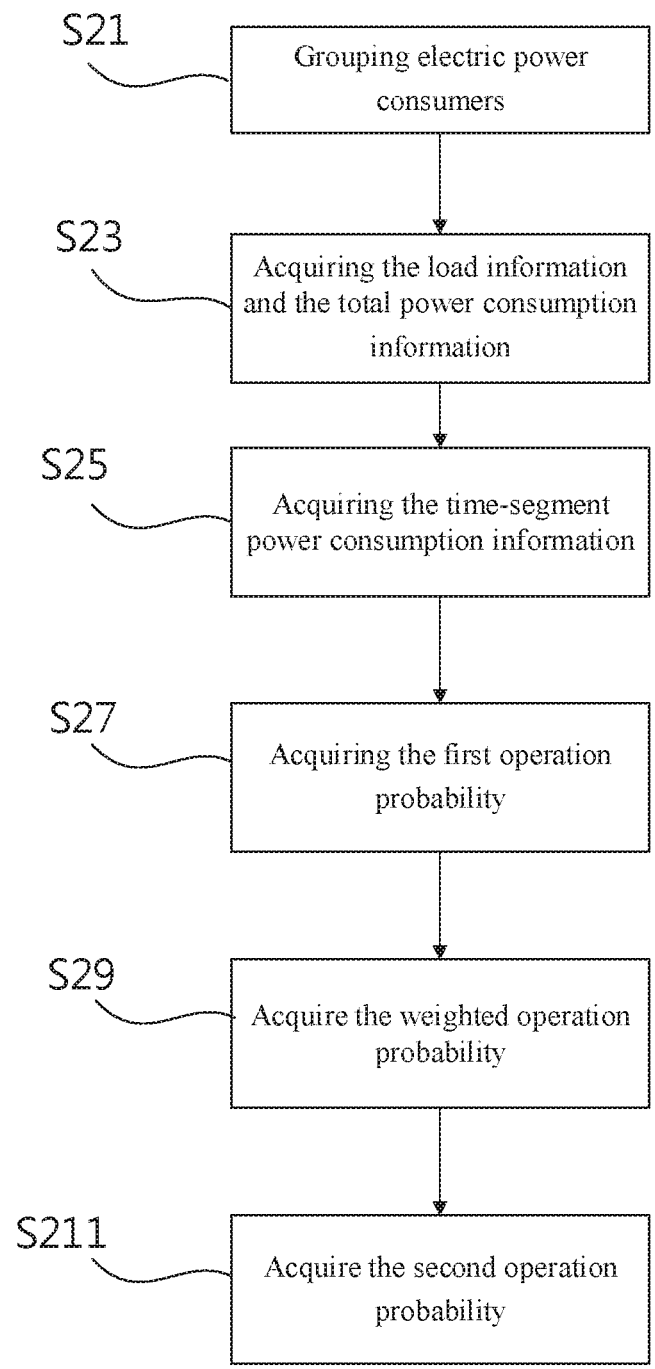
FIG. 6 shows a flowchart of the method for acquiring the load operation probability of electric power consumer groups according to the fourth embodiment of the present invention.

Next, the flow of the method for acquiring the load operation probability of an electric power consumer according to the fourth embodiment of the present invention will be described. Please refer to FIG. 6, which shows a flowchart of the method for acquiring the load operation probability of electric power consumer groups according to the fourth embodiment of the present invention. As shown in the figure, the difference between the present embodiment and the third one is that the present embodiment further comprises step S29 and step S211.

According to the present embodiment, in the step S27, the server 5 calculates to give a plurality of first operation probabilities of each load. Each first operation probability corresponds to an algorithm, respectively.

In the step S29, acquire the weighted operation probability. The server 5 multiplies each first operation probability of each load by a weighting of the corresponding algorithm, respectively, and gives a plurality of weighted operation probabilities of the first load.

In the step S211, acquire the second operation probability. The server 5 gives the second operation probability of each load using an optimization support strategy algorithm (for example, the augmented Lagrangian method) according to the plurality of weighted operation probabilities of each load. According to the present embodiment, after the first operation probability of each load is acquired using multiple algorithms, the second operation probability of each load can be acquired using the weighting method and the optimization support strategy. Compared with the third embodiment using a single algorithm, the second operation probabilities acquired according to the present embodiment can give better accuracy.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for acquiring a load operation probability of an electric power consumer, comprising:
    acquiring a plurality pieces of load information of an electric power consumer and a piece of total power consumption information of said plurality pieces of load information in a period;
    dividing said period into a plurality of time segments and calculating to give a plurality pieces of time-segment power consumption information;
    calculating from said plurality pieces of time-segment power consumption information and said plurality of load information to give a first operation probability for each load of a plurality of loads corresponding to said plurality pieces of load information using a corresponding algorithm for each of the loads, wherein each of the first operation probabilities of each of the loads corresponds to the corresponding algorithm used;
    multiplying each of the first operation probabilities of each of said pieces of load information by a weighting of the corresponding algorithm used to calculate said first of operation probabilities for each of the loads to give a second plurality of weighted operation probabilities for each of the loads; and
    calculating a total power consumption of the power consumer using the first operation probabilities for each of the loads and the second operation probabilities for each of the loads.

2. The method of claim 1, further comprising the step of acquiring a piece of behavior information of said electric power consumer in said step of acquiring said plurality pieces of load information of an electric power consumer and said piece of total power consumption information of said plurality pieces of load information in said period, and further calculating to give said first operation probability of load corresponding to said plurality pieces of load information, respectively, according to said plurality pieces of time-segment power consumption information, said behavior information, and said plurality pieces of load information while calculating said first operation probability; where said behavior information is selected from the group consisting of work days/non-work days, entertainment time, dining time, toilet time, bedtime, and other daily routines.

3. The method of claim 1, and further comprising the step of acquiring a piece of feature information of said electric power consumer in said step of acquiring said plurality pieces of load information of an electric power consumer and said piece of total power consumption information of said plurality pieces of load information in said period, and further calculating to give said first operation probability of load corresponding to said plurality pieces of load information, respectively, according to said plurality pieces of time-segment power consumption information, said feature information, and said plurality pieces of load information while calculating said first operation probability; where said feature information is selected from the group consisting of weather feature, temperature feature, residence location feature, building feature, electric power consumer feature, and power consumption feature.

4. The method of claim 1, further comprising the step of acquiring a piece of behavior information and a piece of feature information of said electric power consumer in said step of acquiring said plurality pieces of load information of an electric power consumer and said piece of total power consumption information of said plurality pieces of load information in said period, and further calculating to give said first operation probability of load corresponding to said plurality pieces of load information, respectively, according to said plurality pieces of time-segment power consumption information, said behavior information, said feature information, and said plurality pieces of load information while calculating said first operation probability; where said behavior information is selected from the group consisting of work days/non-work days, entertainment time, dining time, toilet time, bedtime, and other daily routines; and said feature information is selected from the group consisting of weather feature, temperature feature, residence location feature, building feature, electric power consumer feature, and power consumption feature.

5. The method of claim 1, wherein said first operation probability of load is calculated and acquired by using single-particle algorithms or double-particle algorithms.

6. The method of claim 1, and after said step of acquiring said plurality pieces of time-segment power consumption information according to said power consumption information and said time segments, further comprising the steps of:
    normalizing said plurality pieces of time-segment information; and
    normalizing said plurality pieces of load information.

7. The method of claim 1, wherein said load information is the operation power rating of load.

8. The method of claim 1, wherein said plurality of loads have different power ratings.

* * * * *